(12) United States Patent
Hume

(10) Patent No.: US 7,553,538 B2
(45) Date of Patent: Jun. 30, 2009

(54) FIRE RETARDANT COMPOSITE PANEL PRODUCT AND A METHOD AND SYSTEM FOR FABRICATING SAME

(75) Inventor: Graham Hume, Jacksonville, OR (US)

(73) Assignee: Sierra Pine LTD, Roseville, CA (US)

( * ) Notice: Subject to any disclaimer, the term of this patent is extended or adjusted under 35 U.S.C. 154(b) by 147 days.

(21) Appl. No.: 11/185,570

(22) Filed: Jul. 19, 2005

(65) Prior Publication Data

US 2005/0249934 A1  Nov. 10, 2005

Related U.S. Application Data

(62) Division of application No. 10/600,567, filed on Jun. 20, 2003, now Pat. No. 7,354,503.

(51) Int. Cl.
*B32B 21/02* (2006.01)
(52) U.S. Cl. ............ 428/292.4; 442/140; 442/413
(58) Field of Classification Search ............ 428/292.4; 442/140, 413; 181/294
See application file for complete search history.

(56) References Cited

U.S. PATENT DOCUMENTS

| | | | |
|---|---|---|---|
| 1,778,147 A | 10/1930 | Edwards | |
| 1,860,134 A | 5/1932 | Brown | |
| 1,939,082 A | 12/1933 | Quinn | |
| 3,245,870 A | 4/1966 | Orth et al. | |
| 4,039,645 A * | 8/1977 | Coyle | 264/118 |
| 4,130,538 A | 12/1978 | Shutt | |
| 4,145,242 A * | 3/1979 | Chow | 156/316 |
| 4,182,681 A * | 1/1980 | Gumbert | 252/607 |
| 4,438,028 A * | 3/1984 | Schmittmann et al. | 252/609 |
| 4,734,163 A | 3/1988 | Eberhardt et al. | |
| 4,801,404 A | 1/1989 | Dietrich et al. | |
| 4,935,457 A | 6/1990 | Metzner et al. | |
| 5,019,618 A * | 5/1991 | Chiu | 524/405 |
| 5,047,275 A * | 9/1991 | Chiu | 428/106 |
| 5,093,058 A | 3/1992 | Harmon et al. | |
| 5,188,785 A | 2/1993 | Bauer et al. | |
| 5,200,267 A | 4/1993 | Bauer | |
| 5,560,807 A | 10/1996 | Hauser | |
| 5,632,848 A | 5/1997 | Richards et al. | |
| 5,840,381 A | 11/1998 | Ohtsuka | |
| 6,306,317 B1 | 10/2001 | Richards et al. | |
| 6,511,561 B1 | 1/2003 | Kohlhammer et al. | |
| 6,616,804 B2 | 9/2003 | Foster et al. | |
| 2004/0041127 A1 | 3/2004 | Lloyd et al. | |
| 2004/0231916 A1* | 11/2004 | Englert et al. | 181/296 |

OTHER PUBLICATIONS

Borax Detergent Book: Introduction - Borates as Multi-Function Cleaning Agents [online]. [retrieved on Apr. 6, 2007] Retrieved from the Internet: <URL: http://www.borax.com/detergents/intro.html>.
ASTM E-84 Class 1 Standard Standard Test Method for Surface Burning Characteristics of Building Materials; ASTM Standards; Jul. 2001.

* cited by examiner

*Primary Examiner*—N. Edwards

(57) ABSTRACT

In one embodiment, a fire retardant composite panel material is fabricated. A water-based slurry comprising partially soluble boric acid and borax pentahydrate solids is created. An adhesive used in the composite panel fabrication process is added to fibers. The water-based slurry is separately added to the adhesive and, after mixing, to the fibers. The composite panel produced thereby is also described.

16 Claims, 4 Drawing Sheets

FIRE RETARDANT COMPOSITE PANEL PRODUCT AND A METHOD AND SYSTEM FOR FABRICATING SAME

RELATED U.S. PATENT APPLICATION

This application is a divisional of 10/600,567 filed Jun. 20, 2003, now U.S. Pat. No. 7,354,503.

FIELD OF THE INVENTION

The present invention relates to the field of manufactured wood or other agricultural fiber products fabrication. More specifically, embodiments of the present invention are directed to a wood or other agricultural fiber product and a method and system for fabricating a fire retardant composite panel.

BACKGROUND OF THE INVENTION

Medium density fiberboard (MDF) is a wood or agricultural fiber based composite material that draws on the usage of fibers, rather than particles or veneers, to produce board or sheet products. Although it is typically made as a panel or sheet, its use in decorative and structural products is increasing. It is also increasingly replacing particleboard in uses such as furniture manufacture, cabinet making, craft work, and flooring. Its advantages include high strength, ease of machining, good weathering properties, and the ability to be made from a wide variety of fibrous products including recycled materials.

FIG. 1 is a block diagram of an exemplary composite panel manufacturing process 100. In step 105 of FIG. 1, raw material is furnished. The primary constituent of MDF is typically a softwood that has been broken down into fibers, that is, the very cells (tracheids, vessels, fibers and fiber-tracheids), which are far smaller entities than those used in particleboard. The furnish for MDF normally consists of wood chips, or other agricultural residues, that may be delivered from offsite locations such as sawmill, plywood plants, furniture manufacturing facilities, chip mills, whole tree chipping operations, or farms. Alternatively, the wood chips may be prepared onsite. For example, whole logs are debarked, cut to manageable lengths, and sent to chippers which cut the logs into chips. The fiber materials are then softened in step 110, typically, in a steam-pressurized digester and processed in a refiner chamber (e.g., refining 115 of FIG. 1). In the refiner chamber, single or double revolving disks are used to mechanically pulp the softened materials into fibers suitable for making the board.

After defibration, the fibers are conducted at a high velocity through a blowline. In the blowline, wax is added to the fibers to improve the moisture resistance of the finished board. Additionally, an adhesive resin is added to the wet fibers. This is shown in step 120 of FIG. 1. There are a variety of adhesive resins used in MDF fabrication including urea formaldehyde, phenol formaldehyde, phenolic resins, melamine resins, and isocyanates, or hybrid combinations of these resins. The agitation of fibers in the blowline helps disperse the adhesive resin more consistently throughout the mass of fibers. The resinated fibers are then discharged into a dryer in step 125 to remove excess moisture from them. A cyclonic collector (e.g., fiber recovery 130 of FIG. 1) is often used to collect the resinated fibers after they have been dried.

In step 135, forming of the fiber occurs in which the fiber is typically deposited to a uniform thickness upon a continuous mat or screen. The mat may be pre-pressed before being fed to a hot press (e.g., hot press 140 of FIG. 1) that applies heat and pressure to activate the resin and bond the fibers into a compressed solid panel. The mat may be pressed in a continuous hot press, or the pre-compressed mat may be cut into individual mats before being sent to a multi-daylight hot press. After pressing, the boards are dried and cooled in step 145, before being trimmed, sanded, and sawed to final dimensions in step 150. The boards are typically stored for a few days to allow complete curing of the adhesive resins before being shipped in step 155.

Fire retardant composite panels are used to resist fire and thereby increase the time available for people trapped in burning buildings to escape. Most countries have developed standard test methods for assessing fire retardancy of building materials and building codes that define when such materials must be used in construction and what their properties should be. There are a variety of chemicals that are used to induce fire resistance in composite panels, however, boron and ammonium polyphosphate salts are the most commonly used fire retardant chemicals. For commercial purposes, fire retardant chemicals should be inexpensive, proven to be effective, and readily available to the manufacturer. The most common of these in commercial applications are ammonium polyphosphates and various boron compounds such as boric acid and borax.

Boron based fire retardant chemical treatments are advantageous in that they are less expensive, and provide a greater degree of resistance to smoke development than is realized with polyphosphates in some international standards tests. Additionally, boron based fire retardants allow the use of urea formaldehyde as an adhesive which is less expensive than other commonly used adhesive resins. However, boron based fire retardant chemicals are only partially soluble in water and cannot be made into solutions strong enough to practically impart a sufficient degree of fire retardance to comply with many international standards. Thus, they are typically incorporated as dry powders to the fiber based furnish. For example, some of the earliest fire retardant composite panels manufactured commercially were particle boards that utilized dry boron salts that were mixed with the wood particles in controlled proportions. Recently, some manufacturers of MDF have mimicked the production of boron based fire retardant particle board processes and are adding dry boron salts to their fiber.

Unfortunately, the granular nature and poor dispersion of the dry chemicals requires that relatively high concentrations be used in the panel to gain a desired level of fire resistant performance. The granular boron salts frequently clump into localized regions of high chemical density that can react with overlying veneers and finish products that are applied to the panels and/or weaken the panel by reacting with the adhesive resins.

Ammonium polyphosphate salts tend to be soluble in water and can be readily incorporated into composite panel fabrication processes. They are advantageous over dry chemicals in that the solution provides a more even distribution of the fire retardant chemicals over the particles with fewer regions of concentrated chemicals. As a result, manufacturers of fire retardant MDF panels typically use ammonium polyphosphate. However, the polyphosphates are more expensive chemicals than the dry boron salts and often have adverse effects on the strength and water resistance properties of the panel. As a result, manufacturers have to either accept lower physical properties for their products, or limit the application of fire retardant chemicals to higher density products. Alternatively, some manufacturers use specialized, and more expensive, adhesives to attain a level of performance comparable to non fire retardant panels.

Another manufacturing process for MDF incorporates boric acid and borax fire retardant chemicals by suspending the particles of boron salts in the adhesives used to bind the fibers. This enables utilizing the less expensive urea-formaldehyde adhesives without affecting the properties of the panels. However, the process has several disadvantages. For example, the ratio of fire retardant salts to adhesive is difficult to vary. Thus, if more adhesive is needed to achieve a desired property of the panel, more fire retardant is also incorporated. Conversely, if less adhesive is needed to achieve the desired physical properties of the panel, it is still limited by the need to have minimum fire retardant chemical loadings in the fiber.

A second disadvantage to this process is a limit to the amount of dry chemicals which can be added to the resin slurry before it becomes impractical to pump the slurry. As a result, the amount of dry chemicals that can be added to the adhesives is limited. This is disadvantageous because in some instances, international standards for fire resistance cannot be met, or are on the lower limit of acceptance. As an alternative, additional water can be added to the slurry mixture to facilitate pumping the slurry. However, the addition of water affects the adhesive properties of the resin and sometimes results in reduced productivity as additional time and energy are expended to remove the additional water from the fiber in the drying stage. Another disadvantage is that the pH of the slurry causes the acid cured adhesive to begin to pre-cure. Thus, the resin based slurries have a limited shelf life, typically one day, before they should be discarded.

Another disadvantage in conventional fire resistant composite panel fabrication processes is that the dry fire retardant chemicals cannot be economically acquired in bulk in a finely divided form. It is recognized that the dry chemicals are best incorporated into the composite panel in a finely divided form. However, this necessitates additional processing to create a usable fine powder that adds to the expense of fabricating fire retardant MDF products. Additionally, processing of the boron salt solids into usable fine powders is becoming increasingly difficult in order to comply with stricter environmental and safety regulations that regulate dust levels and aerial contamination.

Because of the greater expense of the fire retardant chemicals, the special adhesives that are necessary, and the effects of the fire retardant chemicals on the properties of the panels, fire resistant MDF tends to be more expensive than fire retardant particle board. Thus, in spite of its advantages in some "high-end" applications, fire resistant MDF has realized only limited commercial acceptance due to the additional costs associated with its manufacture.

SUMMARY OF THE INVENTION

Accordingly, a need exists for a method and system for incorporating less expensive fire retardant chemicals and adhesive chemicals into composite wood or other agricultural fiber materials and wherein the method and system reduce the deleterious effects that those chemicals impart upon the physical properties of the finished composite panel product. While meeting the above stated need, it would be advantageous to meet existing international standards for fire retardance while reducing the density of the finished composite product. Additionally, while meeting the above stated needs, it would be advantageous to reduce the likelihood of pre-curing the adhesive resins used in the composite panel manufacturing process. Finally, while meeting the above stated needs, it would be advantageous to reduce the dust levels and subsequent aerial contamination realized in processes associated with the manufacture of a fire retardant composite panel.

Embodiments of the present invention are directed toward a fire retardant composite panel and a method and system for incorporating fire retardant chemicals into composite materials that reduces the deleterious effects that those chemicals impart upon the physical properties of the finished composite panel. Additionally, embodiments of the present invention allow fabricating a composite panel that is compliant with many significant existing international standards for fire retardance, and that has a lower density than conventional fire retardant composite panels. In embodiments of the present invention, the likelihood of pre-curing the adhesive resins used in the composite panel manufacturing process is reduced. Furthermore, embodiments of the present invention comprise a fire retardant composite panel production process that reduces the dust levels and subsequent aerial contamination inherent in some conventional fabrication processes.

In one embodiment of the present invention, a water-based slurry of partially soluble boron salts is utilized for a fire retardant. The suspended boron salt particles allow a manufacturer to deliver a higher concentration of boron to the fiber than is possible when relying upon dissolved boron salts alone. Because some of the boron salts are dissolved, distribution of the fire retardant is more uniform throughout the composite panel product than in methods that only use dry fire retardant chemicals.

Embodiments of the present invention utilize an in-line high-shear mixer to reduce the size of the suspended boron salt particles. Because the boron salts are contained in a closed system and immersed in water, the dust levels and subsequent aerial contamination inherent in some conventional fabrication processes is reduced. Additionally, the reduced particle size facilitates better distribution of the fire retardant chemicals throughout the composite panel product. This has the additional advantage of not creating localized regions of high chemical density that can react with overlying veneers and finish products and/or weaken the panel by reacting with the adhesive resins. As a result, a lower density composite panel can be made that is still compliant with existing international standards for fire retardance.

In embodiments of the present invention, addition of the water-based slurry is independently controlled from the addition of an adhesive resin. This allows manufacturers to vary the concentration of the fire retardant or adhesive in the panel more easily than some prior art processes in which the fire retardant chemicals were suspended in the adhesive resin. This also reduces the likelihood that the fire retardant chemicals will pre-cure the adhesive resin prior to the hot pressing of the fiber mat.

Embodiments of the present invention can be used in the fabrication of a variety of composite panel products such as: medium density fiber board, particle board, oriented strand board, laminated veneer lumber, and agri-boards. Additionally, the present invention facilitates fabricating these products at a lower cost because the fire retardant chemicals cost less and can be used at lower concentrations than the prior art. Additionally, less expensive adhesive resins can be used with the present invention without adversely affecting the strength and water resistance of the composite panel product. Because of these advantages, a lower density composite panel may be made that is still compliant with many existing standards for fire resistance, and has excellent physical properties.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
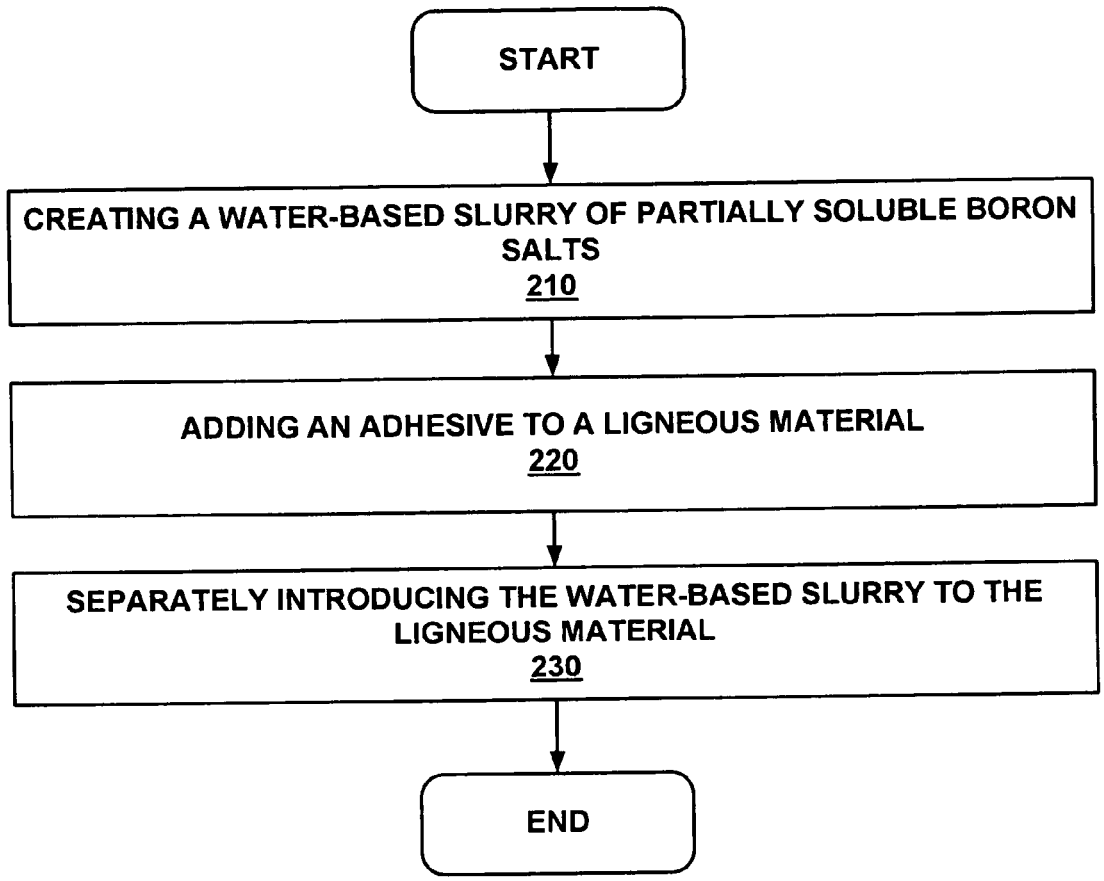
FIG. 2 is a flowchart of a method for fabricating a fire retardant composite panel in accordance with one embodiment of the present invention.

FIG. 2 is a flowchart of a method 200 for fabricating a fire retardant composite panel product in accordance with one embodiment of the present invention. For purposes of clarity, the following discussion references the block diagrams of FIG. 3 and FIG. 4 in conjunction with flowchart 200 of FIG. 2, to describe embodiments of the present invention.

Figure 3:
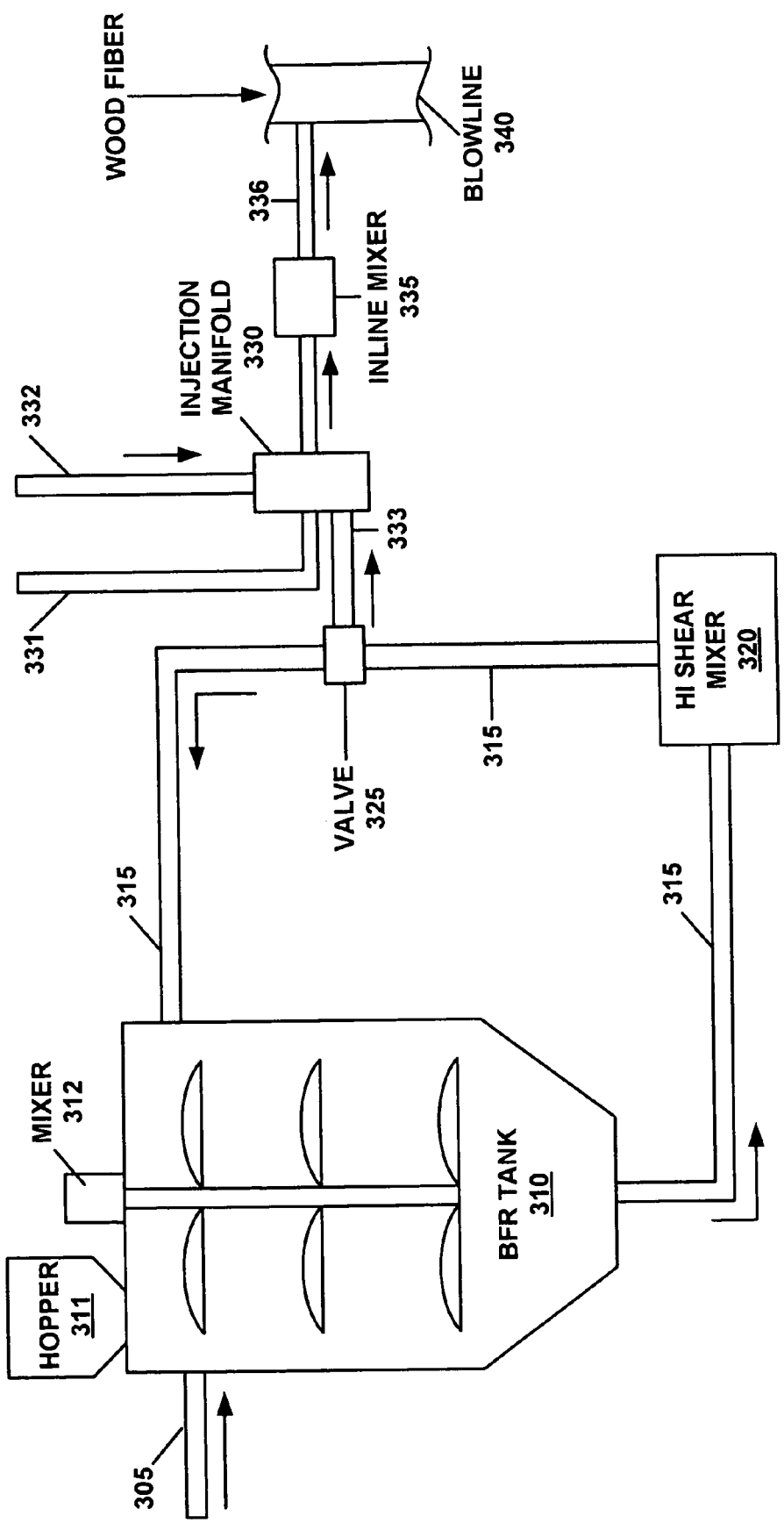
FIG. 3 is a block diagram of an exemplary system for creating a water-based fire retardant slurry utilized in embodiments of the present invention.

In step 210 of FIG. 2, a water-based slurry of partially soluble boron salts is created. Embodiments of the present invention utilize a system that creates a water-based slurry comprising dissolved boron salts and suspended boron salt particles. FIG. 3 is a diagram of a system 300 for creating a water-based fire retardant slurry in accordance with embodiments of the present invention.

Referring now to FIG. 3, water is supplied to a boron fire retardant (BFR) tank 310 via line 305. In the embodiment of FIG. 3, boron salts are added to BFR tank 310 via hopper 311. In one embodiment, the water is heated to approximately 120° F. to facilitate dissolving the boron salts and to reduce the viscosity of the boron salt slurry, however, different suitable temperatures can also be employed.

In one embodiment, a mix of boric acid and borax pentahydrate (an alkali) is used to create the water-based fire retardant slurry of the present invention. In one embodiment, the ratio of these chemicals is controlled to achieve an acid level, e.g. a potential of hydrogen (pH) of between 4.5 and 5.2. Controlling the pH of the fire retardant slurry is important because many of the adhesive resins used in composite panel manufacturing processes are acid cured and heat activated. In using both boric acid and borax pentahydrate (an alkali), the pH of the fire retardant slurry of the present invention can be controlled so that there is a weaker chemical reaction between the fire retardant chemicals and the adhesive resins. As a result, greater internal strength is realized in composite panel products fabricated in accordance with embodiments of the present invention.

A mixer 312 agitates the boron salts in the water to facilitate dissolving the boron salts and to keep the boron salt particles suspended. The fire retardant slurry is pumped via line 315 to a high shear mixer 320 which is used to reduce the size of the suspended boron salt particles. While the present embodiment recites using a high shear mixer, embodiments of the present invention may use other devices for reducing the particle size of fire retardant chemicals that are suspended in the water-based fire retardant slurry. For example, a colloid mill can be used to achieve a similar effect. Additionally, a variable speed pump (not shown) may be coupled with the high shear mixer 320 to control how quickly the fire retardant slurry passes through the high shear mixer. For example, if a smaller particle size is desired for the boron salt solids, the variable speed pumping rate is decreased to facilitate grinding the boron salt solids more finely. Alternatively, if a larger particle size is desired, the variable speed pumping rate is increased. From there, the fire retardant slurry is pumped through line 315 to a valve 325.

As stated above, due to the non-uniform distribution of dry boron salt particles throughout the fibers, a greater concentration of fire retardant chemicals was necessitated in the prior art to achieve compliance with existing standards for fire retardance. This had the deleterious effect of weakening the internal strength of the composite panel. Reducing the particle size of the suspended boron salt solids facilitates better distribution of the fire retardant chemicals throughout the fibers. Additionally, some of the boron salts are dissolved in the fire retardant slurry which also facilitates better distribution of the fire retardant chemicals throughout the fibers. As a result, there is less fiber without some boron salts directly attached to it. Embodiments of the present invention advantageously allow manufacturers to reduce the amount of fire resistant chemicals that they use while still complying with existing standards for fire resistance. This reduces the manufacturing cost of fire retardant composite panel products because fewer fire retardant chemicals are needed. Additionally, panels made at lower density contain less wood, glues and other chemicals, and can be made at a further reduced cost.

Valve 325 is for selectively routing the fire retardant slurry either back to BFR tank 310 via line 315, or to an injection manifold 330, via line 333. Adhesive resin and/or wax and other compounds can be separately input to the injection manifold 330. In the embodiment of FIG. 3, adhesive resin is supplied to injection manifold 330 via line 331, wax is supplied via line 332, and the water-based fire retardant slurry is supplied via line 333. It is appreciated that other materials may also be supplied to injection manifold 330 in embodiments of the previous invention. In the preferred embodiment, the injection manifold 330 comprises a plurality of valves, pumps, and flow meters (not shown) for controlling the amount of adhesive resin, wax, and water-based fire retardant slurry independently.

Figure 1:
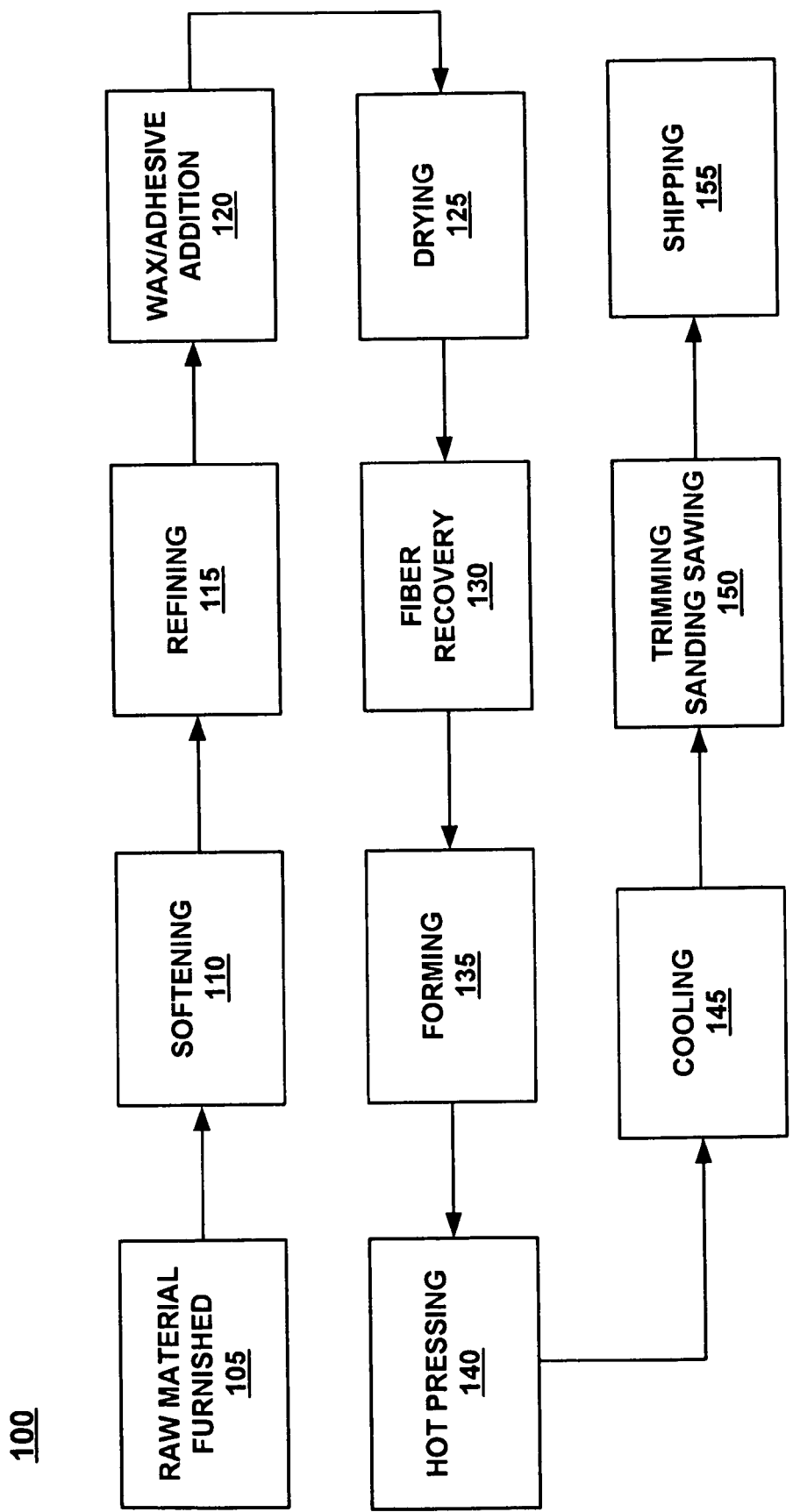
FIG. 1 is a block diagram of an exemplary prior art fiberboard production process.

In one embodiment, the fire retardant slurry, adhesive resins, and wax are then sent to an inline mixer 335 to more thoroughly mix the fire retardant slurry and the adhesive resins. Using inline mixer 335 facilitates coating the suspended boron salt particles in the fire retardant slurry with adhesive, which facilitates their binding with fibers in the blowline. As a result, less of the finely ground chemicals are lost in subsequent processing steps. In conventional manufacturing processes, some dry chemicals are typically lost in the drying and fiber recovery steps (e.g., steps 125 and 130 respectively of FIG. 1) because they are not bound to any fibers by adhesive.

In the present embodiment, the fire retardant chemicals, adhesive resins, and wax are delivered from the inline mixer 335 to a resin injection nozzle (not shown) via line 336. The resin injection nozzle introduces the fire retardant chemicals, adhesive resins, and wax into the blowline 340 at a desired pressure and flow-rate. Although the present embodiment recites a blowline, the present invention may use other devices for supplying a ligneous material, for example in a particle board, Oriented Strand Board, laminated veneer lumber, or other agricultural fiber production process, where blenders are commonly used. In the present embodiment, the blowline 340 conducts the fibers at a high velocity past the resin injection nozzle. The agitation of the fibers in the blowline 340 facilitates dispersal of the fire retardant, adhesive resin, and wax throughout the fibers.

In step 220 of FIG. 2, an adhesive is added to a ligneous material. Adhesive resin is supplied to injection manifold 330 via line 331. From injection manifold 330, the adhesive resin is incorporated, with the boron salt slurry and wax, into the fibers as they pass by in the blowline. While the present invention recites these materials, embodiments of the present invention may utilize other ligneous materials as well. For example, in embodiments of the present invention, the blowline may be substituted by a blender and the fibers substituted by wood particles, wood strands, wood veneer pieces, or agricultural residues.

In one embodiment, urea formaldehyde is used as an adhesive. This is advantageous because of the lower cost of urea formaldehyde in comparison with other adhesive resins typically used in fire retardant composite panels. As stated above, boron based fire retardant chemicals are only partially soluble in water and cannot be made into solutions strong enough to impart a sufficient degree of fire retardance. Therefore, boron based fire retardant chemicals are typically incorporated as dry powders. This has a deleterious effect on the internal strength of the finished product due to un-even distribution of the chemicals. In other words the small boron salt particles tend to interlock and bond more weakly than fibrous materials, and thereby affect the internal strength of the finished product.

Some manufacturers use ammonium polyphosphate salts, which are more readily soluble in water than boron salts, to achieve more uniform distribution of the fire retardant chemicals throughout the fibers. However, ammonium polyphosphate tends to weaken the internal strength of the finished product as well, thus necessitating the use of more expensive adhesive resins to compensate for the reduced strength.

Embodiments of the present invention allow the use of less expensive adhesive resins without reducing the internal strength of the composite panel. The water-based slurry of the present invention can supply a greater concentration of boron based fire retardant chemicals than is possible when relying upon dissolved boron salts alone. Because embodiments of the present invention reduce the particle size of suspended chemical solids, the fire retardant chemicals are distributed more uniformly throughout the fibers. This allows meeting existing standards for fire resistance while using less fire retardant chemicals than conventional methods require.

Additionally, because some of the boron salts are dissolved in the slurry, and the remainder ground into fine particles in solution, more uniform distribution of the fire retardant chemicals is realized than when using dry fire retardant chemicals alone. This reduces the likelihood that localized areas of high chemical concentration will be created in the fiber. Thus, the use of dissolved ammonium polyphosphate salts is not necessary in order to comply with existing standards for fire retardance. As a result, the more expensive adhesive resins necessitated when ammonium polyphosphate salts are used as a fire retardant are not necessitated in the present invention.

In step 230 of FIG. 2, the water-based slurry is independently added to the ligneous material. Referring again to FIG. 3, the water-based fire retardant slurry is supplied via valve 325 and line 333 to injection manifold 330. The present invention is advantageous over conventional methods in that the amount of fire retardant chemicals can be controlled independent of the amount of adhesive resin that is being used.

A variable speed pump (not shown) may be coupled with injection manifold 330 to allow a manufacturer to selectively control the amount of slurry that is introduced into the blowline independent of the amount of adhesive that is added. For example, when a manufacturer wants to utilize a greater ratio of fire retardant in a product to meet standard requirements, the variable speed pumping rate is increased, so that more fire retardant slurry is passed to manifold 330 in a given time period. Alternatively, if a lesser amount of fire retardant is desired, the variable speed pumping rate is reduced, to reduce the amount of slurry that is fed to manifold 330.

A benefit of the present invention is that the fire retardant chemicals are kept separate from the adhesive resins until they are supplied to injection manifold 330. This reduces the amount of time for them to chemically react prior to mixing them with the fibers in the blowline. As a result, the likelihood of pre-curing the adhesive resins is reduced in embodiments of the present invention. Thus, greater internal strength is realized in composite panels fabricated in accordance with embodiments of the present invention.

In conventional fire retardant composite panels, the concentration of fire retardant chemicals is approximately 2.25% of the total weight of the product. In embodiments of the present invention, this can be reduced to as little as 1.75% boron or less (weight for weight) expressed as "B" on an "as is" basis, while still complying with the American Society for Testing and Materials (ASTM) E-84 class 1 standard for fire retardance. In other words, 1.75% of the weight of the composite panel product assayed without any adjustment for the moisture content of the composite panel product. In multi-layer panels, the core of the panels can utilize a concentration of 1.50% fire retardant chemicals and 1.75% in the face panels (as a percentage of the total weight of the individual layer) and still be compliant with the above cited standard for fire retardance. This is advantageous in that it allows a manufacturer to comply with existing standards for fire retardance while reducing fabrication costs. Additionally, composite panels in accordance with the present invention have been shown to meet the following additional international standards for fire retardance: BS 476 class 1, NFP 92-501 class M1, DIN 4102 class B1, and CAN 4-S102M class 1. Furthermore, these standards can be met in a composite panel product having a density of as little as 40 pounds per cubic foot.

Additionally, a lower density composite panel can be fabricated that complies with existing standards for fire retardance. For example, in the prior art, higher panel densities are necessitated to comply with existing standards for fire retardance while still providing a satisfactory amount of panel strength. Thus, manufacturers are generally not able to produce a composite panel that is compliant with the ASTM E-84 class 1 standard for fire retardance that has a density of significantly less than 45 pounds per cubic foot.

Embodiments of the present invention allow the fabrication of a composite panel product that complies with the ASTM E-84 class 1 standard for fire retardance and has a density of 40 pounds per cubic foot. Because the density of the composite panel is reduced, a reduction in the fabrication costs is realized as well.

While meeting the ASTM E-84 class 1 standard, the composite product also has an internal bond strength of better than 100 pounds per square inch. Internal bond strength is a measure of the overall panel integrity that describes how well the fibers are bonded together. It is generally expressed in pounds per square inch and represents the force perpendicular to the panel surface required to pull a standard test sample apart.

Figure 4:
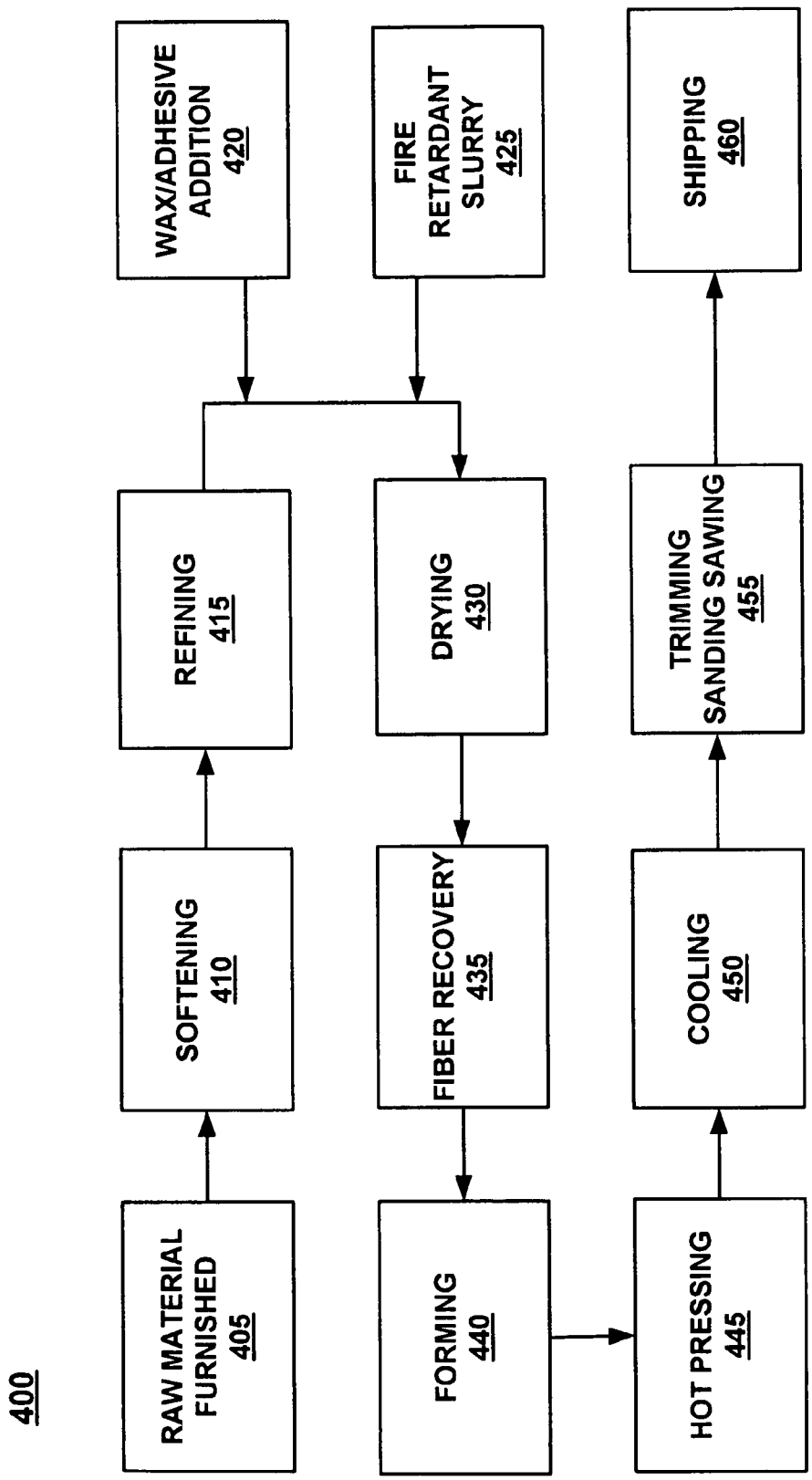
FIG. 4 is a block diagram of an exemplary system for fabricating a fire retardant composite panel in accordance with an embodiment of the present invention.

FIG. 4 is a block diagram of an exemplary system for fabricating a fire retardant composite panel in compliance with embodiments of the present invention. In step 405, raw material is furnished. In embodiments of the present invention, this may comprise wood chips or other wood/agricultural products. In step 410, the raw material is softened. In one embodiment, the raw material is softened in a steam-pressurized digester. In step 415, refining of the softened raw material is performed. For example, in one embodiment a refiner chamber using single or double revolving disks are used to pulp the softened raw material into fibers suitable for manufacturing medium density fiber board. In step 420 wax/adhesive is added to the fibers. Referring again to FIG. 3, wax is supplied to injection manifold 330 via line 332 and adhesive resin is supplied to injection manifold 330 via line 331.

In step 425, fire retardant slurry is supplied. Referring again to FIG. 3, fire retardant slurry is supplied to injection manifold 330 via line 325. In one embodiment, the fire retardant slurry is a water-based slurry of dissolved boron salts and suspended boron salt particles. This facilitates delivering a higher concentration of fire retardant chemicals than is possible relying upon dissolved boron salts alone. Because the fire retardant slurry is delivered to injection manifold 330 separate from the adhesive resin, the present invention facilitates selectively controlling the amount of fire retardant chemicals that are mixed with the fibers independently of the amount of adhesive that is used.

In step 430 of FIG. 4, drying of the fiber takes place, followed by fiber recovery in step 435. In steps 440, 445, and 450 the fiber is formed into mats, hot pressed to remove excess moisture and activate the adhesive resins, and cooled. The panels are trimmed, sanded, and sawed in step 455 and shipped in step 460.

The preferred embodiment of the present invention, a method and system for fabricating a fire retardant composite panel, is thus described. While the present invention has been described in particular embodiments, it should be appreciated that the present invention should not be construed as limited by such embodiments, but rather construed according to the following claims.

What is claimed is:

1. A composite panel comprising:
 a ligneous material bound with an adhesive;
 a fire retardant material disposed on said ligneous material bound with said adhesive; and
 wherein said composite panel has a density of at least 40 pounds per cubic foot ($lb/ft^3$).

2. The composite panel as described in claim 1, wherein said composite panel has an internal strength of at least 100 pounds per square inch (psi).

3. The composite panel as described in claim 1, wherein said is substantially compliant with the American Society for Testing and Materials (ASTM) E-84 class 1 standard for fire retardance.

4. A composite panel as described in claim 1, wherein said fire retardant material is a mixture of boron salts.

5. The composite panel as described in claim 4, wherein said composite panel comprises a boron content of at most approximately 1.75% weight for weight.

6. The composite panel as described in claim 1, wherein said composite panel is selected from the group comprising particle board, medium density fiber board, oriented strand board, laminated veneer lumber, and agri-boards.

7. A composite panel comprising:
 an adhesive;
 a ligneous material bound with said adhesive;
 a fire retardant disposed on said ligneous material bound with said adhesive, wherein said fire retardant comprises boron salts; and
 wherein said composite panel has a density of at least 40 pounds per cubic foot ($lb/ft^3$).

8. The composite panel of claim 7, wherein said ligneous material is selected from the group comprising wood fibers, wood particles, wood veneer, wood strands, and agricultural residues.

9. The composite panel of claim 7, wherein said fire retardant is made from a water-based slurry of partially soluble boron salts, and wherein said water-based slurry comprises a boron salt solution and a suspension of boron salt particles.

10. The composite panel of claim 7, wherein said fire retardant is made from a water-based slurry of partially soluble boron salts, and wherein said water-based slurry comprises boric acid and borax pentahydrate.

11. The composite panel of claim 10, wherein said water-based slurry has a potential of hydrogen (pH) of substantially between 4.5 and 5.2.

12. The composite panel of claim 11, wherein said composite panel has an internal strength of at least 100 pounds per square inch (psi).

13. The composite panel of claim 12, wherein said composite panel comprises a boron content of at most approximately 1.75% weight for weight.

14. The composite panel of claim 7, wherein said fire retardant is made from a water-based slurry of partially soluble boron salts, and wherein said water-based slurry is added to said ligneous material independently from the addition of said adhesive.

15. The composite panel of claim 7, wherein said composite panel is substantially compliant with the American Society for Testing and Materials (ASTM) E-84 class 1 standard for fire retardance.

16. The composite panel of claim 7, wherein said composite panel has a density less than 45 pounds per cubic foot ($lb/ft^3$).

* * * * *